United States Patent
Bailey

(10) Patent No.: US 9,922,371 B1
(45) Date of Patent: Mar. 20, 2018

(54) MERCHANT ISSUED PAYMENT VEHICLES LINKED TO PREEXISTING FINANCIAL ACCOUNTS

(71) Applicant: Vantiv, LLC, Cincinnati, OH (US)

(72) Inventor: Bryan T. Bailey, Florence, KY (US)

(73) Assignee: VANTIV, LLC, Symmes Township, OH (US)

( * ) Notice: Subject to any disclaimer, the term of this patent is extended or adjusted under 35 U.S.C. 154(b) by 492 days.

(21) Appl. No.: 14/609,542

(22) Filed: Jan. 30, 2015

(51) Int. Cl.
*G06Q 40/00* (2012.01)
*G06Q 40/02* (2012.01)
*G06Q 20/40* (2012.01)
*G06Q 30/02* (2012.01)

(52) U.S. Cl.
CPC ......... *G06Q 40/02* (2013.01); *G06Q 20/4012* (2013.01); *G06Q 30/0226* (2013.01)

(58) Field of Classification Search
USPC .......................... 235/375, 379, 380
See application file for complete search history.

(56) References Cited

U.S. PATENT DOCUMENTS

2005/0149394 A1* 7/2005 Postrel ................. G06Q 30/02
705/14.25

* cited by examiner

*Primary Examiner* — Jamara Franklin
(74) *Attorney, Agent, or Firm* — Bookoff McAndrews, PLLC

(57) ABSTRACT

Systems and methods are provided for linking a customer's preexisting financial account to a merchant issued payment vehicle. If an account number associated with the preexisting financial account changes, the linking of the merchant issued payment vehicle is updated with an updated account number.

23 Claims, 5 Drawing Sheets

MERCHANT ISSUED PAYMENT VEHICLES LINKED TO PREEXISTING FINANCIAL ACCOUNTS

TECHNICAL FIELD

The systems and methods described below relate generally to the field of merchant issued payment vehicles. More particularly, the systems and methods relate to the field of linking a merchant issued payment vehicle to a preexisting financial account.

BACKGROUND

Merchants can issue their own payment vehicles to customers as a means for payment with the merchant. These types of payment vehicles are typically only accepted for payment with the merchant and are linked to either 1) a dedicated financial account (e.g., a credit account) that is established during issuance of the payment vehicle to the customer or 2) a financial account that is settled through an Automated Clearing House (ACH) payment network (e.g., a decoupled debit card). In the first instance, these types of payments vehicle can be issued to the customer once a line of credit is established with the merchant, a third party issuer financial institution, or any of a variety of other suitable entities. In the second instance, these types of payment vehicles can be a decoupled debit card that is linked to the customer's checking account and for which purchase transactions are settled over the ACH network.

SUMMARY

In an embodiment, the present disclosure is directed, in part, to a computer-implemented method. The computer-implement method comprises receiving an enrollment communication from a merchant computing device, the enrollment communication comprising a payment vehicle account number, wherein the payment vehicle account number is associated with a preexisting financial account, and wherein the merchant computing device is associated with a merchant and subsequent to receiving the enrollment communication from the merchant computing device, linking a merchant issued payment vehicle to the payment vehicle account number, wherein the merchant issued payment vehicle is associated with a merchant issued payment vehicle account number. The payment vehicle account number is different from the merchant issued payment vehicle account number. The method further comprises, subsequent to linking the merchant issued payment vehicle to the payment vehicle account number, changing the linked payment vehicle account number to an updated payment vehicle account number.

In one embodiment, the present disclosure is directed, in part, to a merchant issued payment vehicle system. The system comprises a merchant issued payment vehicle and a payment processor. The merchant issued payment vehicle has a unique identification number encoded on it. The unique identification number is linked to an account number associated with an account, the account being associated with a PIN-based payment vehicle and a customer loyalty program of a merchant. The payment processor is configured to receive an authorization request from a merchant computing device when the merchant issued payment vehicle is introduced to the merchant computing device, wherein the authorization request comprises the unique identification number and a requested fund amount, and when sufficient funds are available in the account, cause an amount of available funds in the account associated with the PIN-based payment vehicle to be decreased by the requested fund amount. The payment processor is further configured to, when insufficient funds are available, provide a nonsufficient funds message to the merchant computing device.

In one embodiment, the present disclosure is directed, in part, to a method. The method comprises activating a merchant issued payment vehicle associated with a merchant, wherein activating the merchant issued payment vehicle. Activating the merchant issued payment vehicle comprises receiving at a payment processor in communication with a merchant computing device of the merchant, an account number of a PIN-based payment vehicle of a customer, linking a unique account number of the merchant issued payment vehicle to the account number of the PIN-based payment vehicle of a customer, and linking the unique account number of the merchant issued payment vehicle to a customer loyalty account of the merchant.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
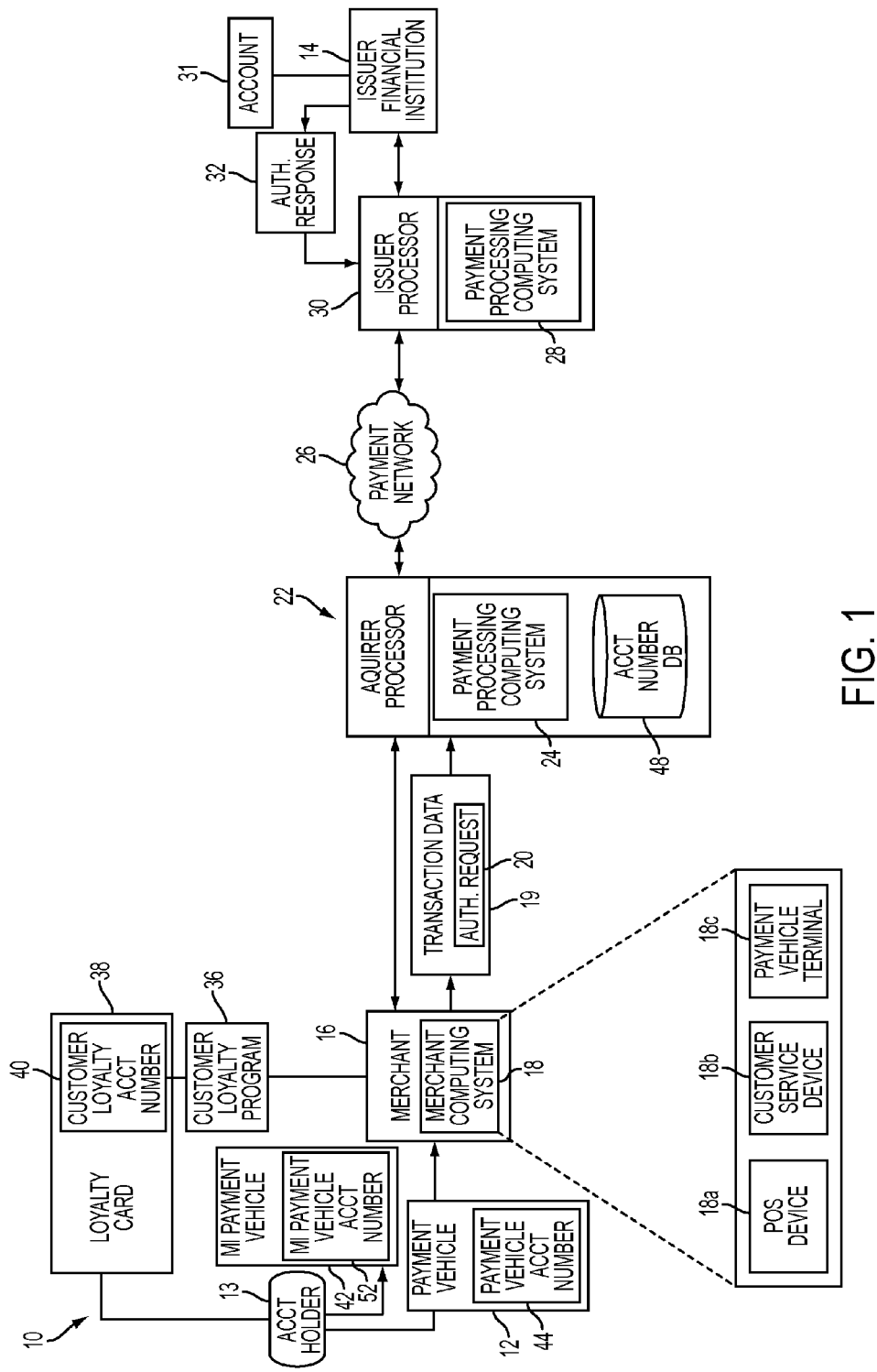
FIG. 1 depicts a system according to one embodiment which includes a merchant that sells products and/or services and various entities within a payment ecosystem.

Various non-limiting embodiments of the present disclosure will now be described to provide an overall understanding of the principles of the structure, function, and use of systems and methods disclosed herein for providing a merchant issued payment vehicle and to linking a customer's preexisting financial account to the merchant issued payment vehicle. One or more examples of these non-limiting embodiments are illustrated in the selected examples disclosed and described in detail with reference made to FIGS. 1-5 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

For simplicity, the description that follows will be provided by reference to a "payment vehicle," which generally refers to any type of financial alternative to currency. As is to be clear to those skilled in the art, no aspect of the present disclosure is specifically limited to a specific type of payment vehicle. Therefore, it is intended that the following description encompasses the use of the present disclosure with many other forms of financial alternatives to currency, including credit cards, debit cards, smart cards, single-use cards, pre-paid cards, electronic currency (such as might be provided through a cellular telephone or personal digital assistant), and the like. Payment vehicles can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A payment vehicle can also have electronic functionality provided by a network of electronic circuitry that is printed or otherwise incorporated onto or within the payment vehicle (and typically referred to as a "smart card"), or be a fob having a transponder and an RFID reader.

FIG. 1 depicts a block diagram of an example payment system 10. In the example payment system 10, a payment vehicle 12 (e.g., a debit card) can be issued to an account holder 13 by an issuer financial institution 14. The issuer financial institution 14 can be any of a variety of financial institutions that is capable of issuing a payment vehicle to an account holder. The payment vehicle 12 can be used to pay a merchant 16 for a payment vehicle transaction at a merchant computing system 18.

The merchant computing system 18 can include any device that facilitates receipt of a payment vehicle for payment of a purchase, such as for example, a point of sale (POS) device 18a (e.g., a terminal or a web interface) a customer service device 18b, and a payment vehicle terminal 18c. When a transaction is initiated at the merchant computing system 18, the merchant computing system can send transaction data 19 for the payment vehicle transaction to an acquirer processor 22 that processes payment vehicle transactions for the merchant 16. The transaction data 19 can include an authorization request 20 that comprises identifying information from the payment vehicle 12, such as a BIN number, an expiration date, and a first and last name of the account holder, for example. The authorization request 20 can also include identifying information from the purchase such as an amount and identifying information from the merchant computing system 18 and/or the merchant 16, for example. A payment processing computing system 24 at the acquirer processor 22 can receive the authorization request 20. The payment processing computing system 24 can translate the authorization request 20, if necessary, and can provide the authorization request 20 to a payment network 26. The payment network 26 can be, for example, a network of a credit card associations affiliated with the payment vehicle 26. Non-limiting examples of credit card associations include VISA, MASTERCARD, DISCOVER, and AMERICAN EXPRESS. The authorization request 20 can then be provided to a payment processing computing system 28 at an issuer processor 30. In response to receiving the authorization request, the payment processing computing system 28 can provide the authorization request 20 to the issuer financial institution 14. Using information from the authorization request 20, the issuer financial institution 14 can associate the payment vehicle transaction with an account 31 of the account holder 13 held by the issuer financial institution 14. The issuer financial institution 14 can then send an authorization response 32 which can either approve or deny the transaction. The authorization response 32 can be provided to the payment processing computing system 28 at the issuer processor 30 and then provided to the payment network 26. The authorization response 32 can then be provided to the payment processing computing system 24 at the acquirer processor 22. Upon receiving the authorization response 32, the payment processing computing system 24 can send either an approval message or a denial message to the merchant computing system 18 to complete the payment vehicle transaction. If the payment vehicle transaction is approved, it can be posted to the account holder's account 31 and reconciled later with the account holder 13 and the merchant 16.

As illustrated in FIG. 1, the account holder 13 can be a member of a customer loyalty program 36 of the merchant 16. The customer loyalty program 36 can be hosted by the merchant 18 or a third party. The account holder 13 can be issued a loyalty card 38 that is associated with a customer loyalty account number 40. The customer loyalty account number 40 can be unique to the account holder 13. When the account holder 13 engages in a financial interaction with the merchant 16 and presents the loyalty card 38 to the merchant computing device 18, the account holder's activity with the merchant 16 (e.g., purchases, returns, redemption of coupons) can be logged at the customer loyalty program 36 according to the account holder's customer loyalty account number 40. Using the data gathered from the account holder 13, the merchant 16 can provide incentives to the account holder 13 such as reward programs and targeted marketing.

As illustrated in FIG. 1 a merchant issued (MI) payment vehicle 42 can be issued to the account holder 13. The MI payment vehicle 42 can be merchant-specific such that it can only be accepted for financial transactions with the merchant 16. As will be described in further detail below, the MI payment vehicle 42 can be linked to a preexisting financial account of the account holder 13. The term "preexisting financial account" as used herein can be understood to mean any financial account (e.g., credit account, checking account, prepaid card account) for which access to funds is available prior to issuance of the MI payment vehicle and for which transactions at a merchant are not settled to the merchant through an Automated Clearing House (ACH) payment network.

It is noted that payment vehicles conventionally issued by, or otherwise affiliated with, a particular merchant are typically linked to either 1) a dedicated financial account (e.g., a credit account) that is established at the time the payment vehicle is issued or 2) a financial account that is settled through a non-Automated Clearing House (ACH) payment network (e.g., a decoupled debit card). In the first instance, the payment vehicle can be issued to a qualifying customer only after a line of credit is established with the merchant, a third party issuer financial institution, or any of a variety of other suitable entities. In the second instance, the payment vehicle can be referred to as a decoupled debit card, as it is linked to the customer's checking account, typically through a bank account number and a routing number. Purchase transactions involving the decoupled debit card are settled over the ACH network, much like how a check is processed. It should be appreciated that utilizing the ACH network for such transactions can be undesirable to some merchants as the ACH network does not provide the ability to check for a non-sufficient funds (NSF) condition prior to authorization of a transaction. Additionally, account holders may undesirably incur processing fees and/or penalty fees if an NSF condition exists at the time of settlement.

Figure 2:
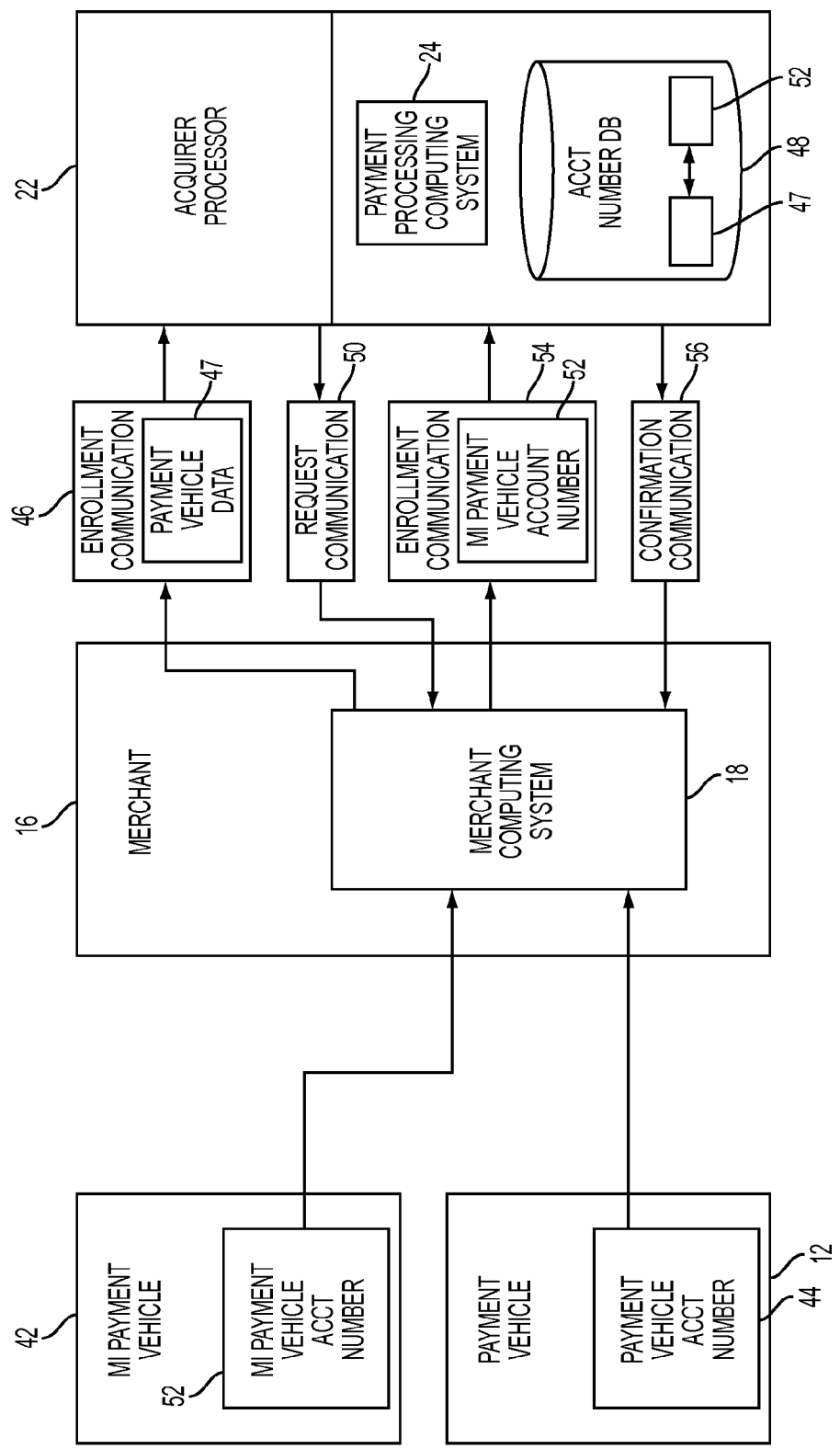
FIG. 2 schematically depicts one example of communication among various entities of the system of FIG. 1 for linking a merchant issued payment vehicle to a customer's preexisting financial account.

In accordance with certain embodiments, systems, apparatus, and methods are provided for linking a customer's preexisting financial account to an MI payment vehicle. In one embodiment, the acquirer processor 22 can facilitate linking of the customer's preexisting financial account to the MI payment vehicle 42. As illustrated in FIG. 2, when the account holder 13 wishes to obtain an MI payment vehicle with the merchant 16, the merchant computer device 18 can first obtain the account holder's payment vehicle account number 44 (e.g., BIN number or other identifying information) from a preexisting payment vehicle (e.g., 12). The preexisting payment vehicle can be a PIN-based payment vehicle, such as a debit card or a gift card, for example, a stored card, a credit card, or any of a variety of other suitable payment vehicles that are already associated with a preexisting financial account. It will be appreciated that the merchant computer device 18 can obtain the payment vehicle account number 44 in a similar manner as a card-present transaction (e.g., by swiping the payment vehicle 12 or physically entering the payment vehicle account number 44 via a keyboard at any of the POS device 18a, the customer service device 18b, and the terminal 18c) or as a non-card present transaction (e.g., online or via telephone). The merchant computer device 18 can then provide an enrollment communication 46 to the acquirer processor 22 that comprises payment vehicle data 47. The payment vehicle data 47 can include the payment vehicle account number 44 as well as other information for the payment vehicle. For example, if the payment vehicle is a PIN-based payment vehicle, such as a debit card or a gift card, the payment vehicle data 47 can include the payment vehicle account number 44 and the PIN number for the payment vehicle. The PIN number can be entered by the account holder 13 into a keypad associated with the merchant computing system 18 after the payment vehicle account number 44 has been obtained.

Upon receipt of the enrollment communication 46, the acquirer processor 22 can send a request communication 50 to the merchant computing system 18 requesting an MI payment vehicle account number 52 of the MI payment vehicle 42. The merchant computing device 18 can then obtain the MI payment vehicle account number 52 of the MI payment vehicle 42 and can provide the MI payment vehicle account number 52 in another enrollment communication 54 to the acquirer processor 22. The MI payment vehicle account number 52 can be unique to the account holder 13 and can be different from the payment vehicle account number 44. Once the acquirer processor 22 receives both enrollment communications 46, 54, the acquirer processor 22 can link the payment vehicle data 47 to the MI payment vehicle account number 52 in an account number database 48. The acquirer processor 22 can then transmit a confirmation communication 56 to the merchant computing system 18 to indicate that the MI payment vehicle 42 has been successfully linked to the payment vehicle account number 44. Once the merchant computing system 18 receives the confirmation communication 56, the merchant 16 can issue the MI payment vehicle 42 to the account holder 13 for use with the merchant 16.

It will be appreciated that the MI payment vehicle account number 52 can be generated in any of a variety of suitable manners. In one embodiment, the acquirer processor 22, or other suitable third party entity, can facilitate creation of blank (e.g., non-issued) MI payment vehicles each having a unique MI payment vehicle account number. Each MI payment vehicle account number can be physically embossed or printed on one of the cards and/or encoded onto a magnetic stripe and/or RFID chip. The blank MI payment vehicles can then be provided in bulk to the merchant 16 for eventual issuance to account holders. When a customer wishes to obtain an MI payment vehicle with the merchant 16, the merchant 16 can select one of the blank cards for the customer. Once the customer has provided a valid account number for a preexisting financial account to the merchant computing system 18, the merchant 16 can input the MI payment vehicle account number of the blank card into the merchant computing system 18 (e.g., by swiping the blank card or manually entering the MI payment vehicle account number at one of the POS device 18a, the customer service device 18b, or the terminal 18c) and the merchant computing system 18 can provide the MI payment vehicle account number to the acquirer processor 22 for linking to the customer's preexisting financial account. Once the MI payment vehicle account number is linked to the customer's preexisting financial account, the MI payment vehicle can be used for financial transactions with the merchant 16.

In another embodiment, the acquirer processor 22, or other suitable third party entity, can supply the merchant computing system 18 with a plurality of unique MI payment vehicle account numbers. When a customer provides a valid account number for a preexisting financial account to the merchant computing system 18, the merchant computing system 18 can select one of the MI account numbers for the customer and can provide the MI payment vehicle account number to the acquirer processor 22 for linking to the customer's preexisting financial account. Once the MI payment vehicle account number is linked to the customer's preexisting financial account, the merchant 16 can issue a temporary MI payment vehicle to the customer. The acquirer processor, or other suitable third party, can then issue a permanent MI payment vehicle (e.g. an embossed card) to the customer at a later date. In yet another embodiment, when a customer provides a valid account number for a preexisting financial account to the merchant computing system 18, the merchant computing system 18 can generate a unique MI account number and can provide the MI payment vehicle account number to the acquirer processor 22 for linking to the customer's preexisting financial account. Once the MI payment vehicle account number is linked to the customer's preexisting financial account, the merchant 16 can issue a temporary MI payment vehicle to the customer. The acquirer processor 22, or other suitable third party, can then issue a permanent MI payment vehicle (e.g. a card) to the customer at a later date.

Figure 3:
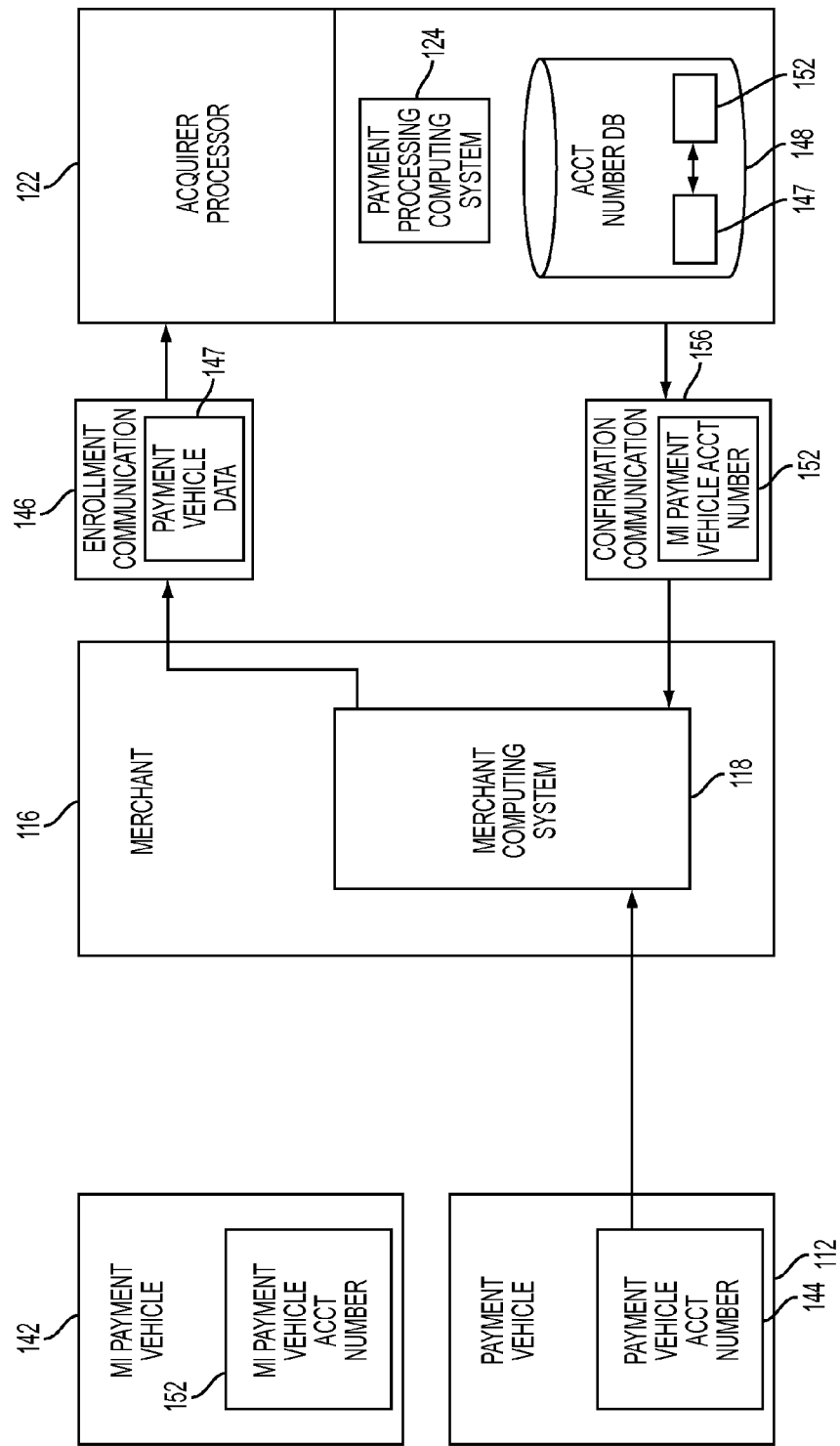
FIG. 3 schematically depicts another example of communication among various entities of the system of FIG. 1 for linking a merchant issued payment vehicle to a customer's preexisting financial account.

In yet another embodiment, the acquirer processor, or other suitable third party can issue the MI payment vehicle account number to the customer upon receiving the preexisting financial information from the merchant computing system 18. An example of such an embodiment is illustrated in FIG. 3 and is similar in many respects to the system shown in FIG. 2. For example, a merchant computing system 118 and an acquirer processor 122 are shown. However, since the acquirer processor 122 can issue an MI payment vehicle account number 152 instead of receiving from the merchant computing system 118, the messaging between the merchant computing system 118 and the acquirer processor 122 can be streamlined. For example, when an enrollment communication 146 is provided to the acquirer processor 122, the payment processing computing system 124 of the acquirer processor 122 can link payment vehicle information 147 to an MI payment vehicle account number 152 which can already be stored in an account number database 148, or at least be generated upon receiving the enrollment communication 146. The payment vehicle data 147 can include the payment vehicle account number 144, as well as other information for the payment vehicle. The acquirer processor can then transmit a confirmation communication 156 with the MI payment vehicle account number 152 to the merchant computing system 118. Upon receiving the MI payment vehicle account number 152, the merchant computing system 118 can issue a temporary MI payment vehicle to the account holder. The acquirer processor 122, or other suitable third party, can then issue a permanent MI payment vehicle (e.g. a card) to the account holder at a later date. In some embodiments, the MI payment vehicle 142 can additionally or alternatively be provided in an electronic format so that the account holder can access the MI payment vehicle via a mobile computing device.

Referring again to FIGS. 1 and 2, once the MI payment vehicle 42 has been linked to a payment vehicle account number 44, the MI payment vehicle 42 can be used to facilitate a payment transaction at the merchant 16 in lieu of presenting the payment vehicle 12. When the MI payment vehicle 42 is used to pay the merchant 16 for a payment vehicle transaction at the merchant computing system 18, the transaction data 19 received by the acquirer processor 22 can include the MI payment vehicle account number 52 and a request for funds in the amount of the transaction. If the preexisting financial account is a PIN-based account, the transaction data 19 can include the PIN number entered by the account holder 13 that is associated with the preexisting financial account linked to the MI payment vehicle 42. The acquirer processor 22 can then determine the payment vehicle account number 44 that is linked to MI payment vehicle account number 52 in the account number database 48. Using the payment vehicle account number 44 linked to the MI payment vehicle account number 52, the acquirer processor 22 can determine whether there are sufficient funds in the preexisting financial account based upon the request for funds from the transaction data. The acquirer processor 22 can then send an approval or denial message to the merchant 18 depending upon whether there are sufficient funds or not.

It will be appreciated that the manner in which the acquirer processor 22 determines whether sufficient funds are available can depend upon the type of preexisting financial account that is linked to the MI payment vehicle 42. For example, if the preexisting financial account is a credit-type account or a debit account, the acquirer processor 22 can send an authorization request that includes the payment vehicle account number 44, the request for funds, and a PIN (if necessary) through the payment network 26 and to the issuer processor 30. If the preexisting financial account is a stored value payment vehicle, such as a gift card or prepaid card, for example, the acquirer processor 22 can send an authorization request that includes the payment vehicle account number 44, the request for funds, and a PIN (if necessary) to the issuer of the stored value payment vehicle. In some embodiments, the acquirer processor 22 can be the issuer of the stored value gift card associated with the MI payment vehicle account number 52. In these instances, the acquirer processor 22 can compare the request for funds against the ledger maintained at the acquirer processor 22 for the stored value payment vehicle and can send either an approval message or a denial message to the merchant computing system 18 based upon the funds available.

It will be appreciated that, after the payment vehicle account number 44 has been successfully linked to the MI payment vehicle 42, the payment vehicle account number 44 might become invalid, such as, for example, when an updated payment vehicle is issued to the account holder 13 (e.g., due to theft of the payment vehicle). When the payment vehicle account number 44 becomes invalid in this manner, the acquirer processor 22 can obtain the updated payment vehicle account number from the issuer of the payment vehicle. In some embodiments, account updating services of various card associations, such as VISA and MASTER CARD, can be utilized by the acquirer processor 22 to facilitate the updating of the account information. Upon obtaining an update, the acquirer processor 22 can link the updated payment vehicle account number to the MI payment vehicle 42 in the account number database 48. The integrity of the MI payment vehicle 42 can accordingly be seamlessly preserved without input from the account holder 13 or the merchant 16 and the without issuing a new MI payment vehicle. In one embodiment, the issuer of the payment vehicle can send the updated payment vehicle account number to the acquirer processor 22 such that MI payment vehicle 42 can be automatically linked to the updated payment vehicle account number. In another embodiment, the acquirer processor 22 can request the updated payment vehicle account number from the issuer upon determining that the authorization request was denied by the issuer for having an invalid account number.

Figure 4:
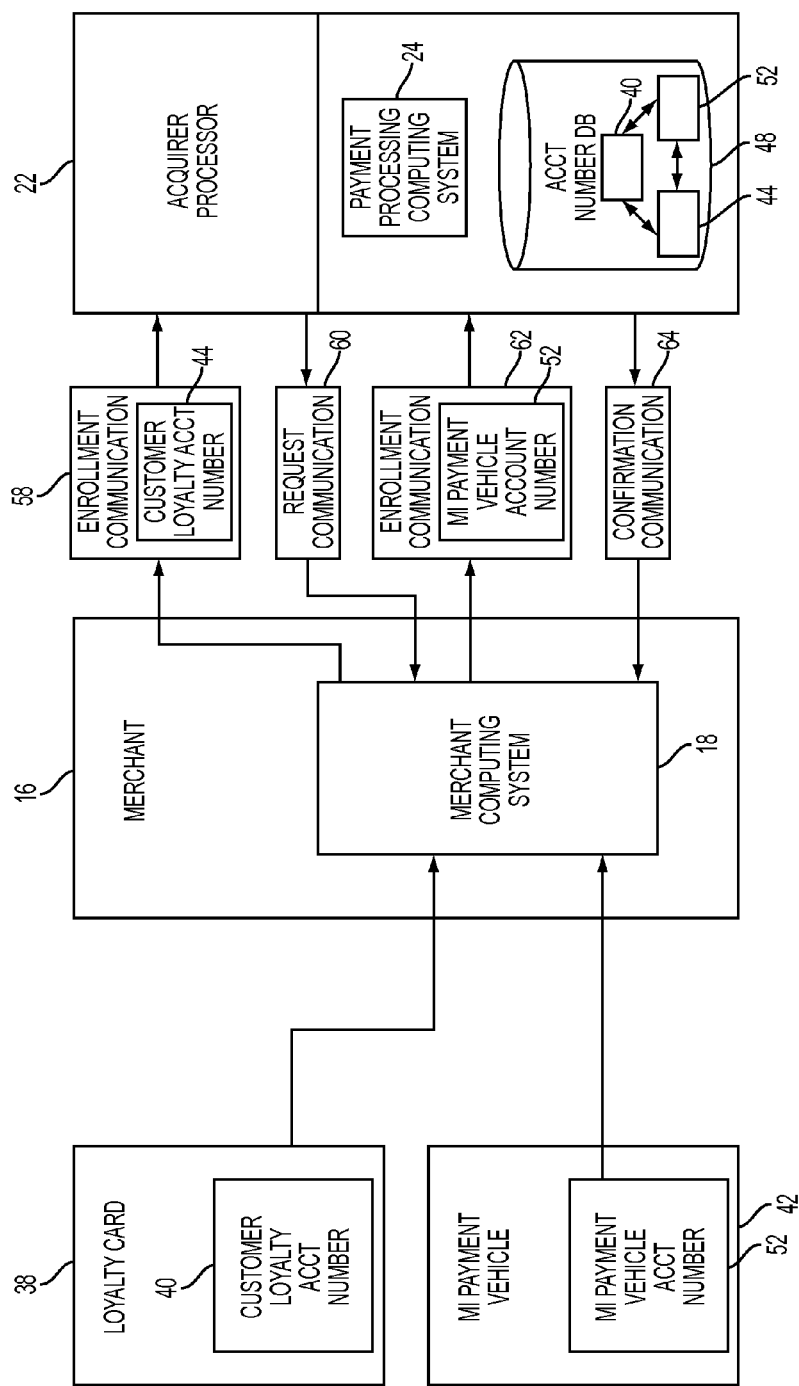
FIG. 4 schematically depicts an example of communication among various entities of the system of FIG. 1 for linking a customer's loyalty rewards account to a merchant issued payment vehicle.
Figure 5:
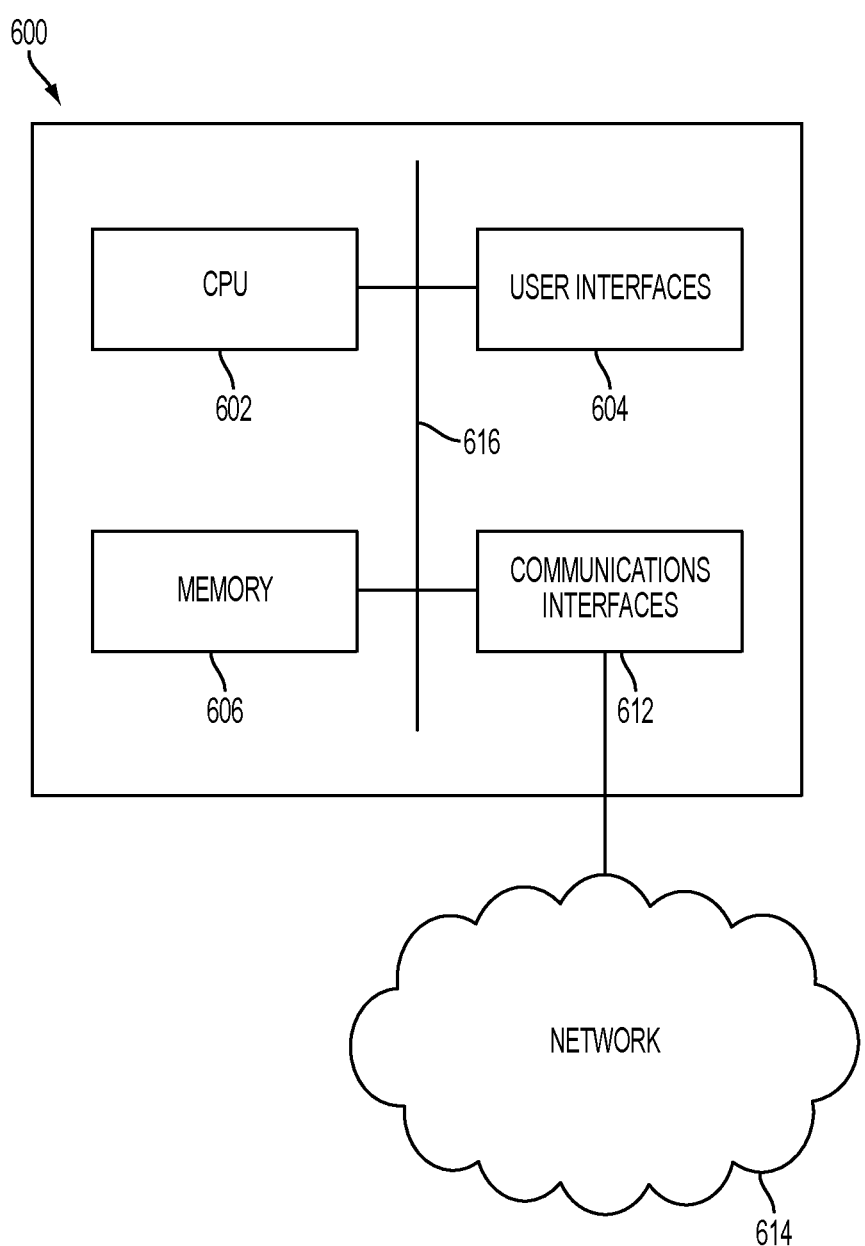
FIG. 5 depicts an example computing device.

In one embodiment, as illustrated in FIG. 4, the customer loyalty account number 40 can be linked to the MI payment vehicle 42 in lieu of or in addition to the loyalty card 38. Linking of the customer loyalty account number 40 to the MI payment vehicle 42 can be same as, or similar to in many respects, linking of the payment vehicle account number 44 to the MI payment vehicle 42 described above. For example, when the account holder 13 wishes to link the customer loyalty account number 40 to the MI payment vehicle 42, the customer's customer loyalty account number 40 can be entered into the merchant computing device 18 and transmitted to the acquirer processor 22 in an enrollment communication 58. The acquirer processor 22 can store the customer loyalty account number 40 in the account number database 48 and can send a request 50 for the MI payment vehicle account number 52. The MI payment vehicle account number 52 can be entered into the merchant computing device 18 and transmitted to the acquirer processor 22 in an enrollment communication 62. Once the acquirer processor 22 receives both enrollment communications 58, 62, the customer loyalty account number 40 can be linked to the MI payment vehicle account number 52 in the account number database 48. The acquirer processor 22 can then transmit a confirmation communication 64 to the merchant computing system 18 to indicate that the MI payment vehicle 42 has been successfully linked to the customer's customer loyalty account number 40.

When the MI payment vehicle 42 is used to pay the merchant 16, the transaction data (e.g., 19 in FIG. 1) received by the acquirer processor 22 can include the MI payment vehicle account number 52. Using the MI payment vehicle account number 52, the acquirer processor 22 can then determine the customer loyalty account number 40 that is linked to MI payment vehicle account number 52. The acquirer processor 22 can then provide transaction data for the purchase to the customer loyalty program 36 for the customer's customer loyalty account number 40. In one embodiment, the transaction data can comprise stock keeping unit (SKU) data of the items purchased from the merchant 16. In such an embodiment, the SKU data can be provided to the customer loyalty program 36 for the customer to facilitate tracking of the specific items purchased by the customer in the customer's customer loyalty account.

If the customer's customer loyalty account number 40 becomes invalid, such as when the customer loyalty program 36 issues a new account number to the customer, the acquirer processor 22 can receive an updated customer loyalty account number from the customer loyalty program 36 and can link the updated customer loyalty account number to the MI payment vehicle account number 52. As a result, the integrity of the MI payment vehicle 42 can be preserved without requiring input from the account holder 13 regarding the updated customer loyalty account number.

Although the acquirer processor 22 is described above as linking a customer's preexisting financial account to an MI payment vehicle, the process can be performed by one or more of a merchant, an acquirer processor, an issuer process, an issuing financial institution, or other types of third party entities within a payment ecosystem.

The processes described above can be performed on or between one or more computing devices 600. Referring now to FIG. 4, an example computing device 600 is presented. A computing device 600 can be a server, a computing device that is integrated with other systems or subsystems, a mobile computing device, a cloud-based computing capability, and so forth. The computing device 600 can be any suitable computing device as would be understood in the art, including without limitation, a custom chip, an embedded processing device, a tablet computing device, a merchant computing system 18, a payment processing computer system 24, a payment processing computer system 28, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 600 includes a processor 602 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 600 also includes one or more memories 606, for example read only memory (ROM), random access memory (RAM), cache memory associated with the processor 602, or other memories such as dynamic RAM (DRAM), static ram (SRAM), programmable ROM (PROM), electrically erasable PROM (EEPROM), flash memory, a removable memory card or disk, a solid state drive, and so forth. The computing device 600 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 602, or memories 606 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 612 can be configured to transmit to, or receive data from, other computing devices 600 across a network 614. The network and communication interfaces 612 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 612 can include wired data transmission links such as Ethernet and TCP/IP. The communication interfaces 612 can include wireless protocols for interfacing with private or public networks 614. For example, the network and communication interfaces 612 and protocols can include interfaces for communicating with private wireless networks such as a WiFi network, one of the IEEE 802.11x family of networks, or another suitable wireless network. The network and communication interfaces 612 can include interfaces and protocols for communicating with public wireless networks 612, using for example wireless protocols used by cellular network providers, including Code Division Multiple Access (CDMA) and Global System for Mobile Communications (GSM). A computing device 600 can use network and communication interfaces 612 to communicate with hardware modules such as a database or data store, or one or more servers or other networked computing resources. Data can be encrypted or protected from unauthorized access.

In various configurations, the computing device 600 can include a system bus 616 for interconnecting the various components of the computing device 600, or the computing device 600 can be integrated into one or more chips such as programmable logic device or application specific integrated circuit (ASIC). The system bus 616 can include a memory controller, a local bus, or a peripheral bus for supporting input and output devices 604, and communication interfaces 612. Example input and output devices 604 include keyboards, keypads, gesture or graphical input devices, motion input devices, touchscreen interfaces, one or more displays, audio units, voice recognition units, vibratory devices, computer mice, and any other suitable user interface.

The processor 602 and memory 606 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A computer-implemented method, comprising:
   receiving an enrollment communication from a merchant computing device, the enrollment communication comprising a payment vehicle account number, wherein the payment vehicle account number is associated with a preexisting financial account, and wherein the merchant computing device is associated with a merchant;
   subsequent to receiving the enrollment communication from the merchant computing device, linking a merchant issued payment vehicle to the payment vehicle account number, wherein the merchant issued payment vehicle is associated with a merchant issued payment vehicle account number, wherein the payment vehicle account number is different from the merchant issued payment vehicle account number; and
   subsequent to linking the merchant issued payment vehicle to the payment vehicle account number, changing the linked payment vehicle account number to an updated payment vehicle account number.

2. The computer-implemented method of claim 1, further comprising:
   linking the merchant issued payment vehicle to a consumer loyalty program associated with the merchant.

3. The computer-implemented method of claim 2, wherein linking the merchant issued payment vehicle to a consumer loyalty program associated with the merchant comprises linking the merchant issued payment vehicle account number to the consumer loyalty program.

4. The computer-implemented method of claim 3, comprising:
   linking the merchant issued payment vehicle account number to a customer loyalty account number of the customer loyalty program; and
   subsequent to linking the merchant issued payment vehicle to the customer loyalty account number, changing the customer loyalty account number to an updated customer loyalty account number.

5. The computer-implemented method of claim 1, wherein the payment vehicle account number is associated with a PIN-based payment vehicle.

6. The computer-implemented method of claim 1, wherein the payment vehicle account number is associated with a debit card.

7. The computer-implemented method of claim 1, wherein the payment vehicle account number is associated with a stored value card.

8. The computer-implemented method of claim 1, wherein the payment vehicle account number is associated with a gift card.

9. The computer-implemented method of claim 1, wherein the payment vehicle account number is associated with a gift prepaid.

10. The computer-implemented method of claim 1, comprising:
    subsequent to linking a merchant issued payment vehicle to the payment vehicle account number, receiving transaction data from the merchant computing device, the transaction data comprising the merchant issued payment vehicle account number and a request for funds.

11. The computer-implemented method of claim 10, wherein the transaction data comprises a PIN number associated with the preexisting financial account linked to the merchant issued payment vehicle.

12. The computer-implemented method of claim 11, comprising:
    determining whether the preexisting financial account linked to the merchant issued payment vehicle has sufficient funds for an amount requested in the transaction data.

13. The computer-implemented method of claim 10, wherein the transaction data comprises stock keeping unit (SKU) data.

14. The computer-implemented method of claim 1, comprising:
    when the payment vehicle account number is not valid, linking the merchant issued payment vehicle to the preexisting financial account to an updated payment vehicle account number received from an issuer of the payment vehicle for the preexisting financial account.

15. The computer-implemented method of claim 1, wherein the merchant issued payment vehicle is a card having the merchant issued payment vehicle account number encoded on it.

16. The computer-implemented method of claim 1, wherein the merchant issued payment vehicle account number is unique.

17. A merchant issued payment vehicle system, comprising:
    a merchant issued payment vehicle having a unique identification number encoded on the merchant issued payment vehicle, the unique identification number linked to an account number associated with an account, the account being associated with a PIN-based payment vehicle and a customer loyalty program of a merchant; and
    a payment processor configured to:
        receive an authorization request from a merchant computing device when the merchant issued payment vehicle is introduced to the merchant computing device, wherein the authorization request comprises the unique identification number and a requested fund amount;
        when sufficient funds are available in the account, cause an amount of available funds in the account associated with the PIN-based payment vehicle to be decreased by the requested fund amount; and
        when insufficient funds are available, provide a non-sufficient funds message to the merchant computing device.

18. The merchant issued payment vehicle system of claim 17, wherein the PIN-based payment vehicle is any of a debit card, a prepaid card, a stored value card and a gift card.

19. The merchant issued payment vehicle system of claim 17, wherein the payment processor is configured to link the unique identification number to an updated account number when the account number is not valid for processing.

20. The merchant issued payment vehicle system of claim 19, wherein the payment processor is configured to:
    communicate with an issuer financial institution associated with the PIN-based payment vehicle, and
    receive the updated account number from the issuer financial institution.

21. A method, comprising:
    activating a merchant issued payment vehicle associated with a merchant, wherein activating the merchant issued payment vehicle comprises:
    receiving at a payment processor in communication with a merchant computing device of the merchant, an account number of a PIN-based payment vehicle of a customer;
    linking a unique account number of the merchant issued payment vehicle to the account number of the PIN-based payment vehicle of a customer; and
    linking the unique account number of the merchant issued payment vehicle to a customer loyalty account of the merchant.

22. The method of claim 21, comprising:
    subsequent to activating the merchant issued payment vehicle associated with the merchant, receiving a request for funds from the merchant computing device when the unique account number of the merchant issued payment vehicle is provided to the merchant computing device;
    determining that the unique account number of the merchant issued payment vehicle is linked to the account number of the PIN-based payment vehicle of a customer;
    determining if the account identified by the account number has sufficient funds; and providing to the merchant computing device a response to the request for funds.

23. The method of claim 21, comprising:
    when the account number of the PIN-based payment vehicle of the customer is changed, linking the unique account number of the merchant issued payment vehicle to an updated account number.

* * * * *